United States Patent
Kim et al.

(10) Patent No.: US 9,246,146 B2
(45) Date of Patent: Jan. 26, 2016

(54) BATTERY PACK

(75) Inventors: Myeongcheol Kim, Yongin-si (KR); Taeyong Kim, Yongin-si (KR); Hyunye Lee, Yongin-si (KR); Kangsik Jung, Yongin-si (KR); Shidong Park, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 530 days.

(21) Appl. No.: 12/926,334

(22) Filed: Nov. 10, 2010

(65) Prior Publication Data

US 2011/0300424 A1 Dec. 8, 2011

(30) Foreign Application Priority Data

Jun. 4, 2010 (KR) .................. 10-2010-0052884

(51) Int. Cl.
*H01M 2/10* (2006.01)
*H01M 2/20* (2006.01)
*H01M 2/30* (2006.01)

(52) U.S. Cl.
CPC .............. *H01M 2/1077* (2013.01); *H01M 2/20* (2013.01); *H01M 2/30* (2013.01)

(58) Field of Classification Search
None
See application file for complete search history.

(56) References Cited

U.S. PATENT DOCUMENTS

| 4,337,301 | A | * | 6/1982 | Rorer et al. | 429/179 |
| 5,159,272 | A | * | 10/1992 | Rao et al. | 324/429 |
| 5,293,951 | A | * | 3/1994 | Scott | 180/68.5 |
| 5,645,448 | A | * | 7/1997 | Hill | 439/522 |
| 5,804,770 | A | * | 9/1998 | Tanaka | 174/138 F |
| 2007/0122687 | A1 | * | 5/2007 | Sakurai et al. | 429/42 |
| 2009/0253027 | A1 | | 10/2009 | Yang et al. | |

FOREIGN PATENT DOCUMENTS

| JP | 10-069893 A | 3/1998 |
| JP | 2003-168404 A | 6/2003 |
| KR | 20 2000-0013927 U | 7/2000 |
| KR | 10 2005-0041303 A | 5/2005 |
| KR | 10 2007-0110567 A | 11/2007 |
| WO | WO 2009/140277 | * 11/2009 |

* cited by examiner

*Primary Examiner* — Alix Eggerding
(74) *Attorney, Agent, or Firm* — Lee & Morse, P.C.

(57) ABSTRACT

A battery pack including a plurality of battery cells; a housing accommodating the plurality of battery cells; a connector coupled to the housing, at least a portion of the connector being exposed outside of the housing; and a sealing member coupled to the connector, the sealing member surrounding the exposed portion of the connector.

11 Claims, 10 Drawing Sheets

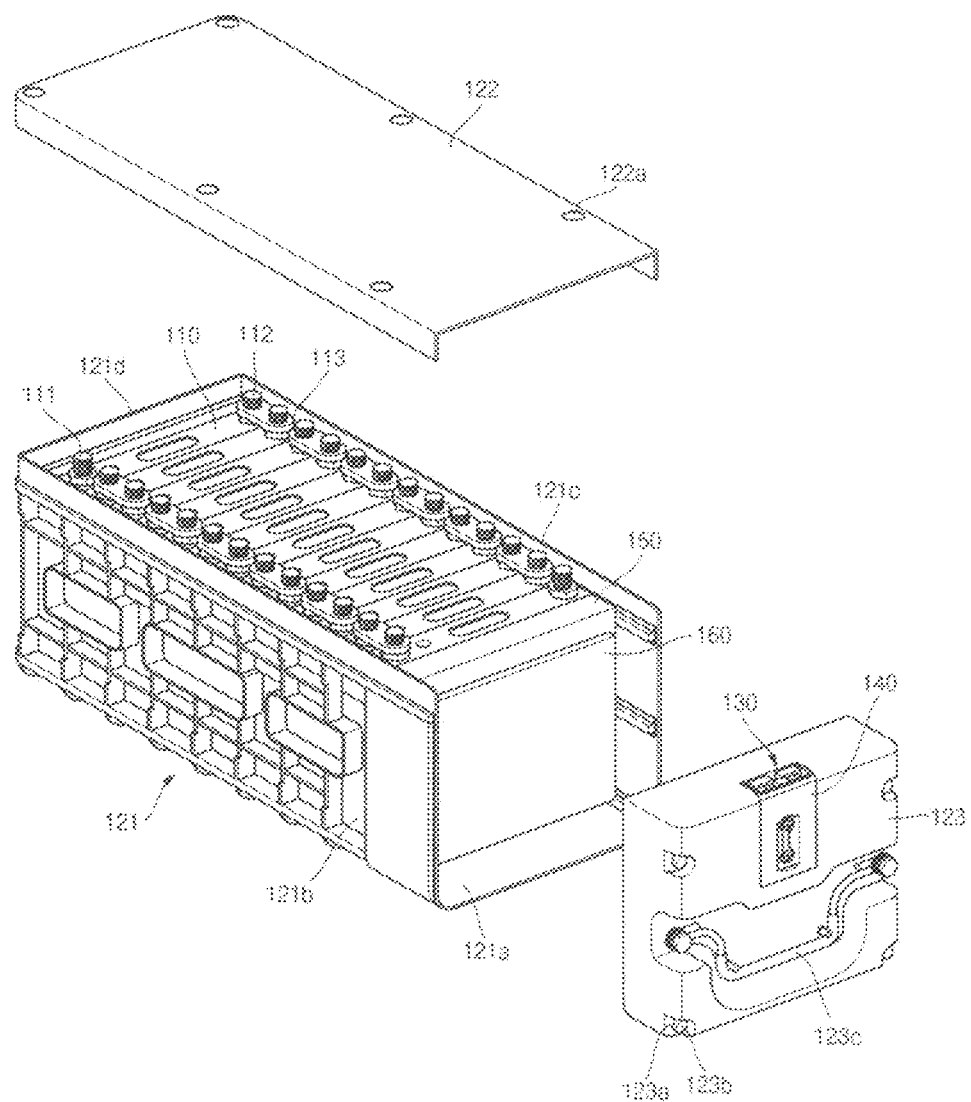

BATTERY PACK

BACKGROUND

1. Field

Embodiments relate to a battery pack.

2. Description of the Related Art

Recently, a high-power battery pack using a nonaqueous electrolyte having a high energy density has been developed. The high-power battery pack may form a large-capacity battery pack by connecting a plurality of secondary batteries to be used for, e.g., motor drive of machines requiring a high power source such as hybrid electric vehicles.

The plurality of secondary batteries may be accommodated in a case to then constitute a battery pack. The case may have a connector that electrically connects the secondary batteries to an external device.

SUMMARY

Embodiments are directed to a battery pack, which represents advances over the related art.

At least one of the above and other features and advantages may be realized by providing a battery pack including a plurality of battery cells; a housing accommodating the plurality of battery cells; a connector coupled to the housing, at least a portion of the connector being exposed outside of the housing; and a sealing member coupled to the connector, the sealing member surrounding the exposed portion of the connector.

The sealing member may include rubber.

The sealing member may include a thread hole therein.

The connector may include a thread groove therein, the thread groove corresponding to the thread hole.

The housing may include a case in which the battery cells are placed; a top cover covering an upper portion of the case; and a side cover covering a side surface of the case.

The connector may be coupled to the side cover.

The sealing member may be coupled to the side cover.

The battery pack may further include an end plate closely coupling the battery cells to the case.

The case may include a bottom surface; a pair of long side surfaces connected to the bottom surface, the pair of long side surfaces being substantially perpendicular to the bottom surface; and a short side surface connected to the bottom surface and the long side surfaces, the short side surface being substantially perpendicular to the bottom surface.

The battery pack may further include a circuit module between the battery cells and side cover, the circuit module being electrically connected to the connector.

The connector may include a positive electrode terminal electrically connected to a positive electrode tab of the battery cells; and a negative electrode terminal electrically connected to a negative electrode tab of the battery cells.

The sealing member may include a body surrounding an exterior side of the connector, the body being coupled to one side surface of the housing.

The sealing member may include a body surrounding an exterior side of the connector, the body being coupled to one side surface of the housing; and a terminal cover covering the positive and negative electrode terminals of the connector, the terminal cover being coupled to a top surface of the housing.

The terminal cover may have an opening part therein.

The sealing member may include a body surrounding an exterior side of the connector, the body being coupled to one side surface of the housing; and a terminal cover covering the positive and negative electrode terminals of the connector, the terminal cover being coupled to a top surface of the housing, and the terminal cover may include a protrusion part therein.

The body may include a protrusion groove detachably engagable with the protrusion part.

The sealing member may include a body surrounding an exterior side of the connector, the body being coupled to one side surface of the housing; and a terminal cover covering the positive and negative electrode terminals of the connector, the terminal cover being coupled to a top surface of the housing, and the terminal cover may include an opening groove therein.

BRIEF DESCRIPTION OF THE DRAWINGS

The above and other features and advantages will become more apparent to those of ordinary skill in the art by describing in detail exemplary embodiments with reference to the attached drawings, in which:

FIG. 1B illustrates an exploded perspective view of the battery pack shown in FIG. 1A;

DETAILED DESCRIPTION

Figure 1A:
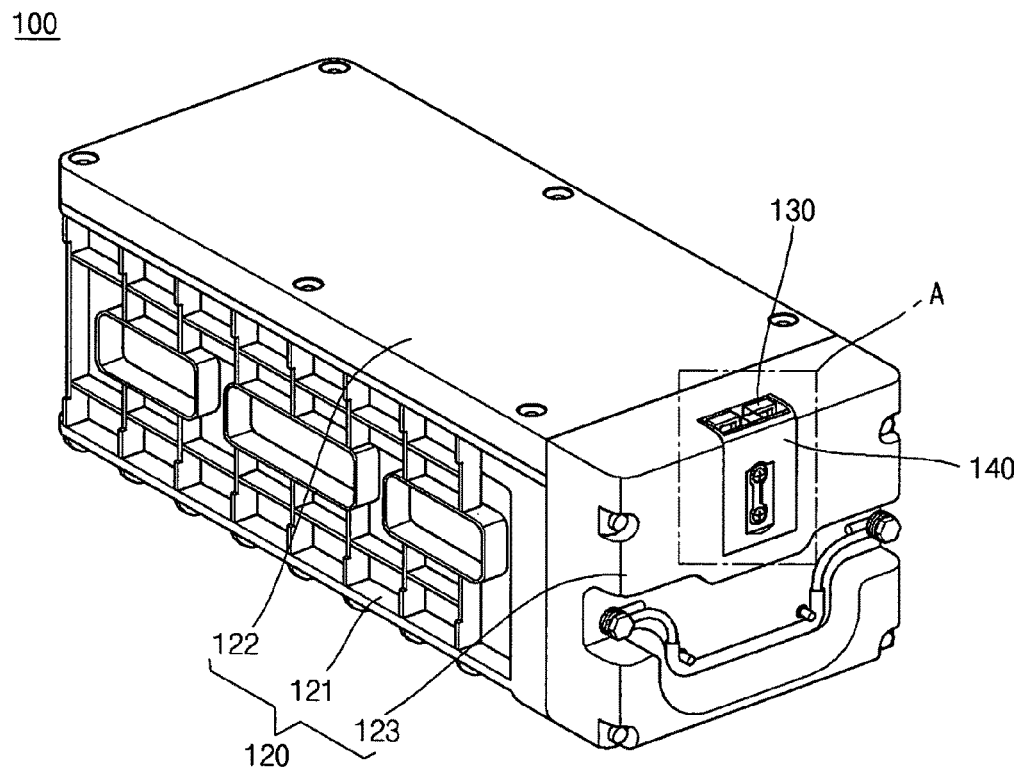
FIG. 1A illustrates a perspective view of a battery pack according to an embodiment.

Korean Patent Application No. 10-2010-0052884, filed on Jun. 4, 2010, in the Korean Intellectual Property Office, and entitled: "BATTERY PACK," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1C:
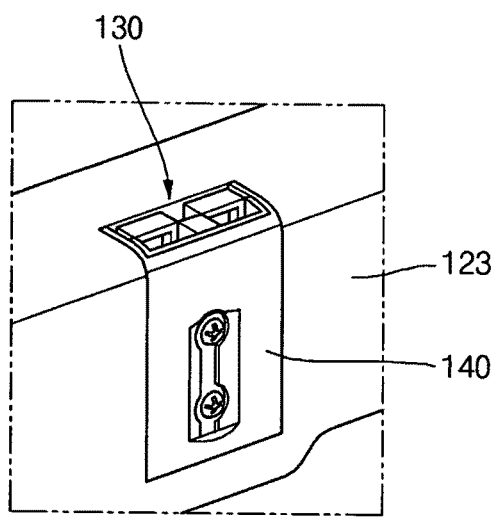
FIG. 1C illustrates an enlarged view of a portion 'A' shown in FIG. 1A.

FIG. 1A illustrates a perspective view of a battery pack according to an embodiment. FIG. 1B illustrates an exploded perspective view of the battery pack shown in FIG. 1A. FIG. 1C illustrates an enlarged view of a portion 'A' shown in FIG.

Figure 1D:
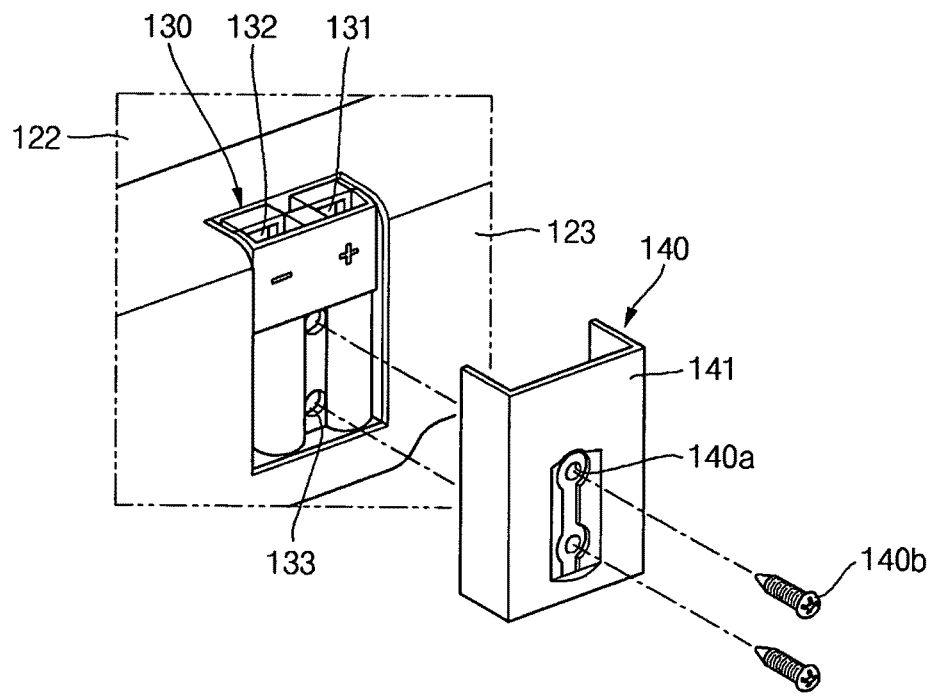
FIG. 1D illustrates an exploded perspective view of a connector and a sealing member shown in FIG. 1C.

1A. FIG. 1D illustrates an exploded perspective view of a connector and a sealing member shown in FIG. 1C.

Referring to FIGS. 1A through 1D, the battery pack 100 according to the present embodiment may include a plurality of battery cells 110, a housing 120, a connector 130, and a sealing member 140. The battery pack 100 may further include an end plate 150 and a circuit module 160.

Each of the battery cells 110 may include an electrode assembly (not illustrated) having a positive electrode plate, a negative electrode plate, and a separator interposed between the positive electrode plate and the negative electrode plate, a case accommodating the electrode assembly, and a cap plate coupled to the case and sealing the same. In addition, each of the battery cells 110 may include a positive electrode tab 111 electrically connected to the positive electrode plate and protruding outside of the cap plate and a negative electrode tab 112 electrically connected to the negative electrode plate and protruding outside of the cap plate. A plurality of battery cells 110 may be combined to form the battery pack 100. Here, in the plurality of battery cells 110, respective positive electrode tabs 111 and negative electrode tabs 112 may be electrically connected to each other by a connecting member 113.

As described above, the positive electrode tab 111 may be electrically connected to the positive electrode plate and may protrude outside of the cap plate. For example, one side of the positive electrode tab 111 may be welded to an uncoated portion of the positive electrode plate and may be electrically connected to the positive electrode plate, while another side of the positive electrode tab 111 may pass through the cap plate and protrude outside of the cap plate. In an implementation, the positive electrode tab 111 of one of the plurality of battery cells 110 may be connected to positive electrode tabs other battery cells 110 by the connecting member 113 and may be electrically connected to a positive electrode terminal 131 of the connector 130, which will be described below.

As described above, the negative electrode tab 112 may be electrically connected to the negative electrode plate and may protrude outside of the cap plate. For example, one side of the negative electrode tab 112 may be welded to an uncoated portion of the negative electrode plate and may be electrically connected to the negative electrode plate, while another side of the negative electrode tab 112 may pass through the cap plate and may protrude outside of the cap plate. In an implementation, the negative electrode tab 112 of one of the plurality of battery cells 110 may be connected to negative electrode tabs of other battery cells 110 by the connecting member 113 and may be electrically connected to a negative electrode terminal 132 of the connector 130, which will be described below.

In an implementation connecting member 113 may electrically connect the positive electrode tab 111 of each of the plurality of battery cells 110. In addition, the connecting member 113 may electrically connect negative electrode tabs 112 of each of the plurality of battery cells 110. The connecting member 113 may include a conductive metal, e.g., aluminum, an aluminum alloy, or nickel plated steel.

The housing 120 may include a lower case 121, a top cover 122, and a side cover 123. The housing 120 may include a space in which the plurality of battery cells 110 are accommodated. The housing 120 may include a conductive metal, e.g., aluminum, an aluminum alloy, or nickel plated steel.

The lower case 121 may include a portion in which the battery cells 110 are seated. For example, the lower case 121 may include a bottom surface 121a, a pair of long side surfaces 121b and 121c, and a short side surface 121d. The battery cells 110 may be seated in the lower case 121 and may be covered by the top cover 122 and the side cover 123, thereby completing the battery pack 100.

The bottom surface 121a may have a rectangular shape having a pair of opposed long sides and a pair of opposed short sides. The long side surfaces 121b and 121c may be disposed along both of the pair of long sides and may be disposed vertically to be connected to the bottom surface 121a. The short side surface 121d may be disposed along one of the pair of short sides and may be disposed vertically to be connected to the bottom surface 121a. In an implementation, the bottom surface 121a, the pair of long side surfaces 121b and 121c and the short side surface 121d may be integrally formed.

The top cover 122 may cover an upper portion of the lower case 121. For example, the top cover 122 may face the bottom surface 121a of the lower case 121. A plurality of holes 122a may be formed in the top cover 122. Threads or rivets may be coupled to the holes 122a, thereby fixing the top cover 122 to the lower case 121.

The side cover 123 may cover one side end of the lower case 121. For example, the side cover 123 may face the short side surface 121d of the lower case 121. A plurality of holes 123a may be formed in the side cover 123. Threads or rivets 123b may be coupled to the holes 123a, thereby fixing the side cover 123 to the lower case 121. In addition, a handle 123c may be formed in the side cover 123, so that the battery pack 100 may be easily moved. The side cover 123 may include the connector 130 and the sealing member 140 coupled thereto.

At least one portion of the connector 130 may be exposed outside of the housing 120 and may be coupled to the side cover 123. An external device (not illustrated) may be connected to the connector 130. The connector 130 may include the positive electrode terminal 131 electrically connected to the positive electrode tabs 111 of the battery cells 110 and the negative electrode terminal 132 electrically connected to the negative electrode tabs 112 of the battery cells 110. A thread groove 133 may be formed in the connector 130. The thread groove 133 may facilitate fixing of the connector 130 to the side cover 123. The thread groove 133 may correspond to a thread hole 140a in the sealing member 140.

The external device may be electrically connected to the battery cells 110 through the connector 130. In an implementation, the external device may include, e.g., a charging device that charges the battery cells 110 or a drive motor that uses energy stored in the battery cells 110.

The sealing member 140 may surround the connector 130 and may be coupled thereto so as to remove or fill a gap between the connector 130 and the side cover 123. In an implementation, the sealing member 140 may be made of, e.g., rubber, thereby preventing infiltration of moisture. Thus, the sealing member 140 may advantageously prevent moisture from permeating between the connector 130 and the side cover 123.

The sealing member 140 may include a body 141 surrounding the connector 130 and a thread hole 140a in the body 141. The body 141 may be coupled to one side of the housing 120, e.g., the side cover 123, and may have a substantially 'U' shape. For example, the body 141 may be substantially coplanar with the one side of the housing 120. An interior surface of the body 141 may be conformally formed to the shape of the connector 130, thereby establishing a substantially perfect contact with the connector 130. The thread hole 140a may facilitate fixing of the sealing member 140 to the connector 130 and may be formed at a location corresponding to the thread groove 133 of the connector 130.

Referring to FIG. 1D, the connector 130 may be coupled to the side cover 123; and the sealing member 140 may be inserted into a gap between the connector 130 and the side cover 123 so as to surround the connector 130. The thread groove 133 in the connector 130 and the thread hole 140a in the sealing member 140 may coincide with each other. Then, screws 140b may be inserted into the thread hole 140a and the thread groove 133 to then be tightened.

When the battery cells 110 are seated in the lower case 121, the end plate 150 may closely couple the battery cells 110 to the lower case 121 to then be fixed to the lower case 121. The end plate 150 may have the same size as the battery cells 110.

The circuit module 160 may be disposed between the battery cells 110 and the side cover 123. The circuit module 160 may be electrically connected between the battery cells 110 and the connector 130 and may be fixed to the end plate 150. For example, the positive electrode tab 111 and the negative electrode tab 112 of the battery cells 110 may be electrically connected to an external terminal (not illustrated) in the circuit module 160; and the external terminal may be electrically connected to the positive electrode terminal 131 and the negative electrode terminal 132 of the connector 130. A circuit for controlling charging and discharging operations of the battery cells 110 may be formed in the circuit module 160.

As described above, the battery pack 100 according to the present embodiment may include the sealing member 140 coupled to one side of the housing 120 while surrounding the connector 130, thereby preventing moisture from permeating into a gap between the housing 120 and the connector 130.

Next, a battery pack according to another embodiment will be described.

Figure 2A:
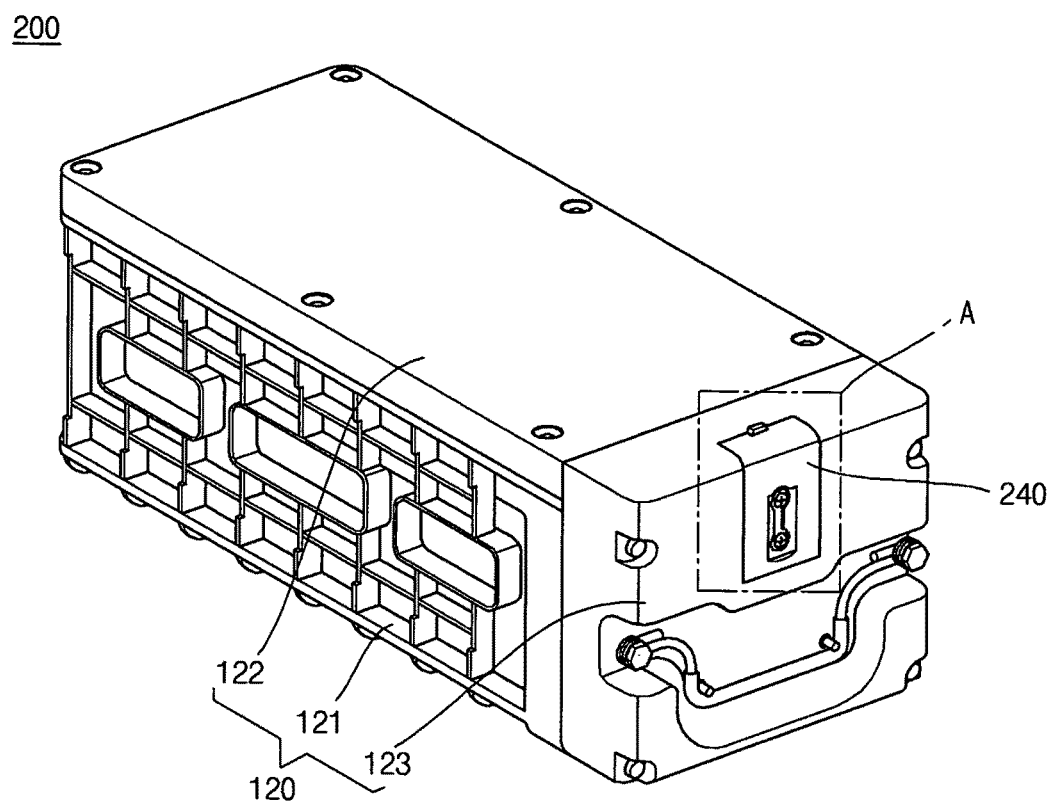
FIG. 2A illustrates a perspective view of a battery pack according to another embodiment.
Figure 2B:
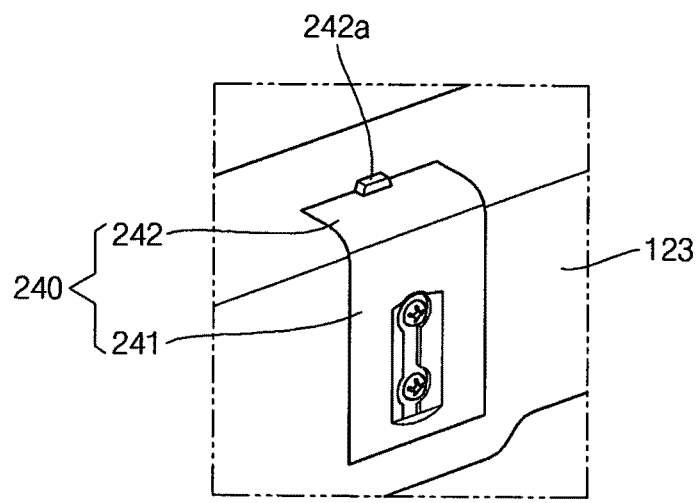
FIGS. 2B and 2C illustrate enlarged views of a portion 'A' shown in FIG. 2A.
Figure 2C:
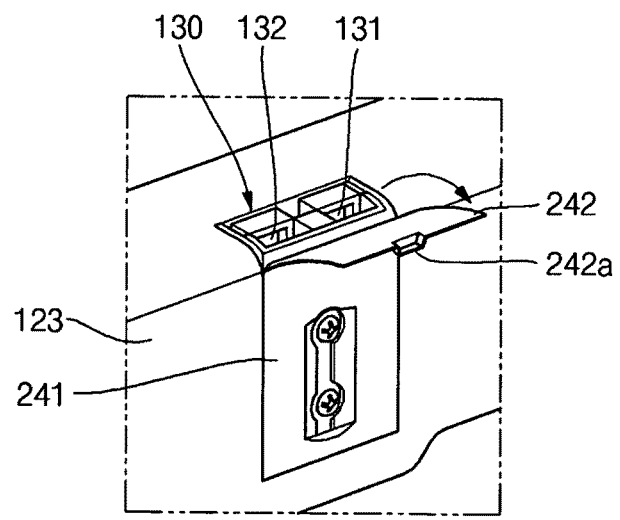

FIG. 2A illustrates a perspective view of a battery pack according to another embodiment. FIGS. 2B and 2C illustrate enlarged views of a portion 'A' shown in FIG. 2A.

The battery pack 200 according to the present embodiment is substantially the same as the battery pack 100 shown in FIG. 1 in view of the configuration and functions, except for a shape of a sealing member 240. Thus, a repetitive explanation will be omitted and the present embodiment will be described with an emphasis on the sealing member 240.

Referring to FIGS. 2A through 2C, the battery pack 200 according to the present embodiment may include a plurality of battery cells 110, a housing 120, a connector 130, and a sealing member 240.

The sealing member 240 may surround the connector 130 and may be coupled thereto so as to remove or fill a gap between the connector 130 and a side cover 123. In an implementation, the sealing member 240 may be made of rubber, thereby preventing undesirable infiltration of moisture. Thus, the sealing member 240 may prevent moisture from permeating between the connector 130 and the side cover 123.

The sealing member 240 may include a body 241 surrounding the connector 130 and a terminal cover 242 covering a positive electrode terminal 131 and a negative electrode terminal 132 of the connector 130.

The body 241 may be coupled to one side of the housing 120, e.g., the side cover 123, and may have a substantially 'U' shape. For example, the body 241 may be substantially coplanar with the one side of the housing 120. An interior surface of the body 241 may be conformally formed to the shape of the connector 130, thereby establishing a substantially perfect contact with the connector 130. A thread hole may be formed to facilitate fixing of the sealing member 240 to the connector 130 and may be formed at a location corresponding to a thread groove of the connector 130.

The terminal cover 242 may be connected to the body 241 and may be coupled to the side cover 123. When coupled to the side cover 123, the terminal cover 242 may be substantially coplanar with a top surface of the housing 120. An opening part 242a may be formed in the terminal cover 242, thereby facilitating opening or closing of the terminal cover 242. The opening part 242a may protrude at one end of the terminal cover 242. Thus, a user may easily open or close the terminal cover 242 by way of the opening part 242a. In addition, since the terminal cover 242 may be integrally formed with the body 241 and may be made of rubber having elasticity, it may not readily be separated from the body 241 during opening or closing.

When the connector 130 is not connected with an external device (not illustrated), a user may close the terminal cover 242 to protect the positive electrode terminal 131 and the negative electrode terminal 132. When desired, the user may open the terminal cover 242 to establish a connection between the positive and negative electrode terminals 131 and 132 and the external device.

As described above, the battery pack 200 according to the present embodiment may include the sealing member 240 coupled to the side cover 123 and surrounding the connector 130, thereby preventing moisture from permeating between the side cover 123 and the connector 130.

In addition, the battery pack 200 according to the present embodiment may include the terminal cover 242 on the sealing member 240, thereby protecting the positive and negative electrode terminals 131 and 132 of the connector 130.

Next, a battery pack according to yet another embodiment will be described.

Figure 3A:
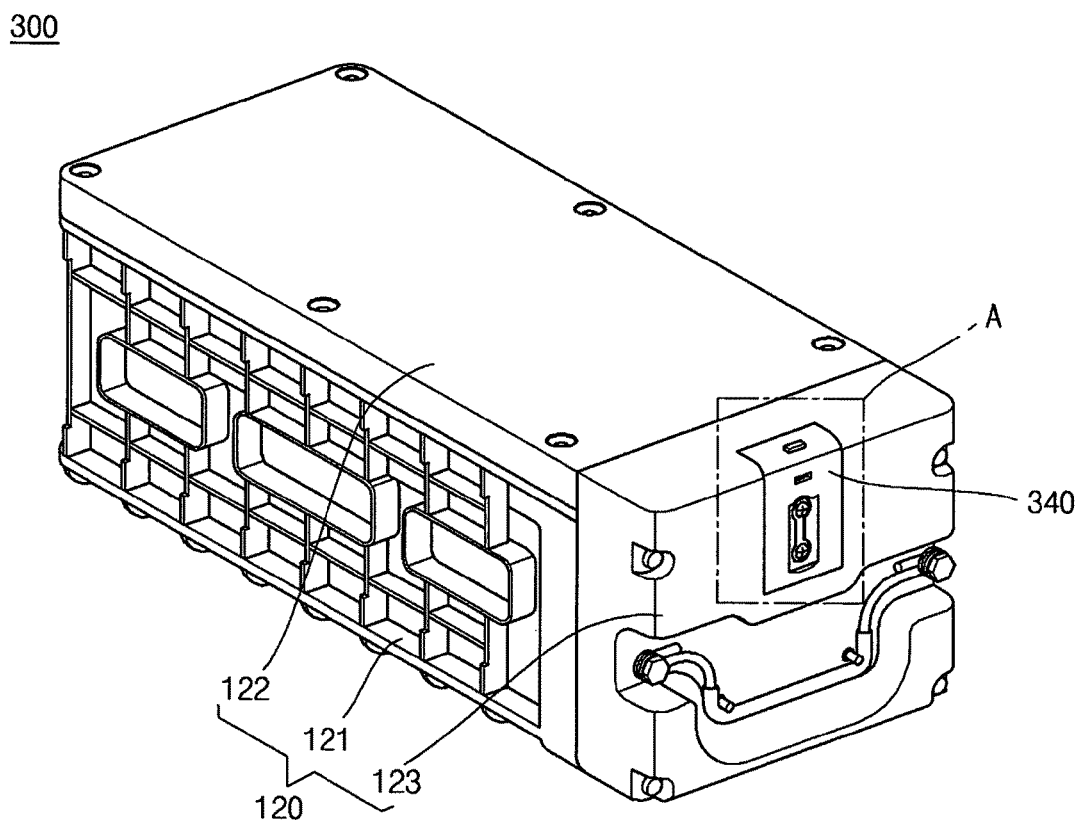
FIG. 3A illustrates a perspective view of a battery pack according to yet another embodiment.
Figure 3B:
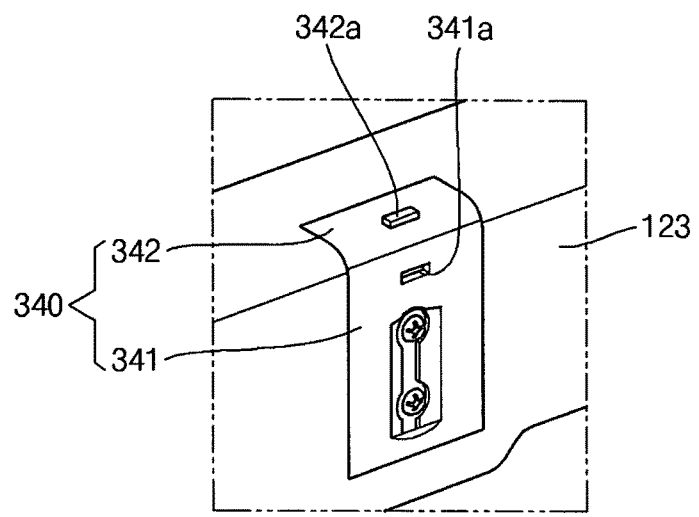
FIGS. 3B and 3C illustrate enlarged views of a portion 'A' shown in FIG. 3A.
Figure 3C:
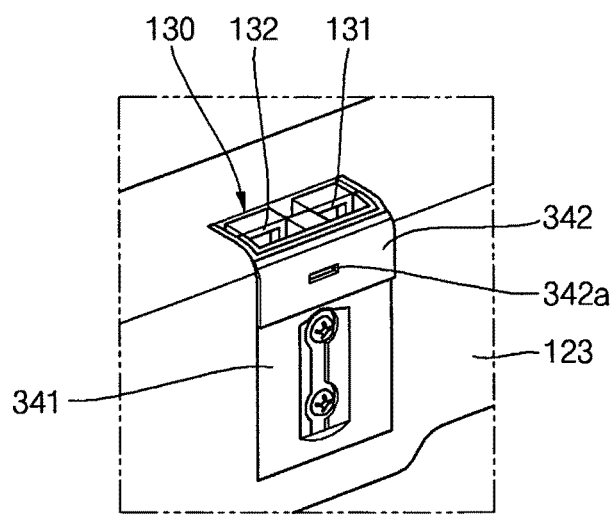

FIG. 3A illustrates a perspective view of a battery pack according to yet another embodiment. FIGS. 3B and 3C illustrate enlarged views of a portion 'A' shown in FIG. 3A.

The battery pack 300 according to the present embodiment is substantially the same as the battery pack 100 shown in FIG. 1 in view of the configuration and functions, except for the shape of a sealing member 340. Thus, a repetitive explanation will be omitted and the present embodiment will be described with an emphasis on the sealing member 340.

Referring to FIGS. 3A through 3C, the battery pack 300 may include a plurality of battery cells 110, a housing 120, a connector 130, and a sealing member 340.

The sealing member 340 may surround the connector 130 and may be coupled thereto so as to remove or fill a gap between the connector 130 and a side cover 123. In an implementation, the sealing member 340 may be made of rubber, thereby preventing undesirable infiltration of moisture. Thus, the sealing member 340 may prevent moisture from permeating between the connector 130 and the side cover 123.

The sealing member 340 may include a body 341 surrounding the connector 130 and a terminal cover 342 covering a positive electrode terminal 131 and a negative electrode terminal 132 of the connector 130.

The body 341 may be coupled to one side of the housing 120, e.g., the side cover 123, and may have a substantially 'U' shape. For example, the body 341 may be substantially coplanar with the one side of the housing 120. An interior surface of the body 341 may be conformally formed to the shape of the connector 130, thereby establishing a substantially perfect contact with the connector 130. A thread hole may be formed to facilitate fixing of the sealing member 340 to the connector 130 and may be at a location corresponding to a thread groove of the connector 130.

The terminal cover 342 may be connected to the body 341 and may be coupled to the side cover 123. When coupled to the side cover 123, the terminal cover 342 may be substantially coplanar with a top surface of the housing 120. A protrusion part 342a may be formed in the terminal cover 342.

The protrusion part 342a may protrude from the terminal cover 342. A protrusion groove 341a corresponding to the protrusion part 342a may be formed in the body 341. The protrusion groove 341a may be formed at one side of the body 341 in the shape of a groove and may have a size corresponding to a size of the protrusion part 342a. Thus, the terminal cover 342 may be be securely fixed by inserting the protrusion part 342a into the protrusion groove 341a. In addition, since the terminal cover 342 may be integrally formed with the body 341 and may be made of rubber having elasticity, it may not be readily separated from the body 341 during opening or closing.

When the connector 130 is not connected with an external device (not illustrated), a user may close the terminal cover 342 to protect the positive electrode terminal 131 and the negative electrode terminal 132. When desired, the user may open the terminal cover 342 to fixedly insert the protrusion part 342a into the protrusion groove 342b, thereby facilitating establishment of a connection between the positive and negative electrode terminals 131 and 132 and the external device.

As described above, the battery pack 300 according to the present embodiment may include the sealing member 340 coupled to the side cover 123 and surrounding the connector 130, thereby preventing moisture from permeating between the side cover 123 and the connector 130.

In addition, the battery pack 300 according to the present embodiment may include the terminal cover 342 on the sealing member 340, thereby protecting the positive and negative electrode terminals 131 and 132 of the connector 130.

Next, a battery pack according to still another embodiment will be described.

Figure 4A:
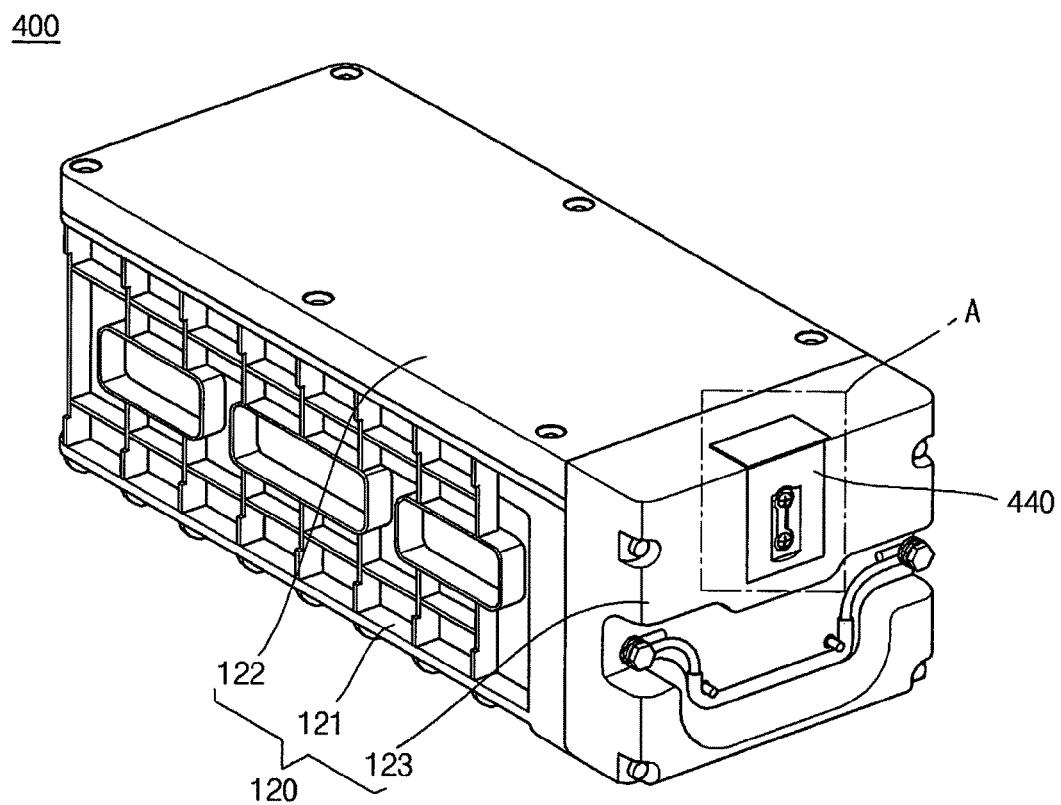
FIG. 4A illustrates a perspective view of a battery pack according to still another embodiment.
Figure 4B:
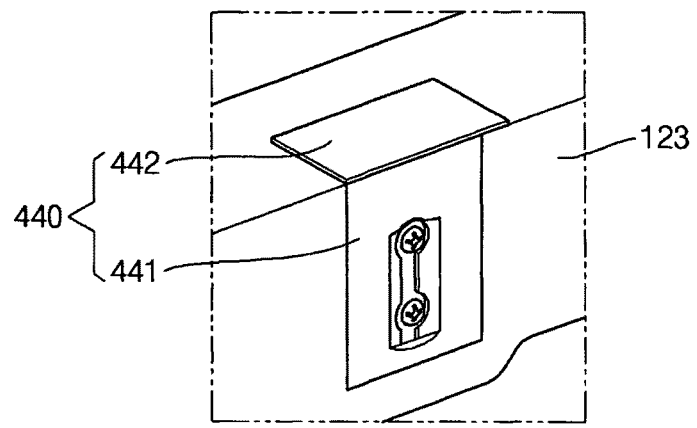
FIGS. 4B and 4C illustrate enlarged views of a portion 'A' shown in FIG. 4A.
Figure 4C:
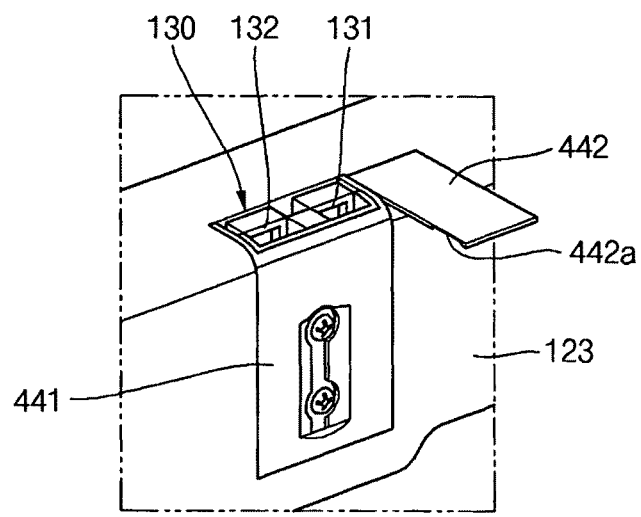

FIG. 4A illustrates a perspective view of a battery pack according to still another embodiment. FIGS. 4B and 4C illustrate enlarged views of a portion 'A' shown in FIG. 4A.

The battery pack 400 according to the present embodiment is substantially the same with the battery pack 100 shown in FIG. 1 in view of the configuration and functions, except for a shape of a sealing member 340. Thus, a repetitive explanation will be omitted and the present embodiment will be described with an emphasis on the sealing member 440.

Referring to FIGS. 4A through 4C, the battery pack 400 may include a plurality of battery cells 110, a housing 120, a connector 130, and a sealing member 440.

The sealing member 440 may include a body 441 surrounding the connector 130 and a terminal cover 442 covering a positive electrode terminal 131 and a negative electrode terminal 132 of the connector 130.

As illustrated in FIG. 4C, one side of the terminal cover 442 may be connected to a side cover 123 of the housing 120. In an implementation, the terminal cover 442 may be separated from the body 441. In addition, the terminal cover 442 may be substantially coplanar with a top surface of the housing 120. An opening groove 442a may be formed in the terminal cover 442, thereby facilitating opening or closing of the terminal cover 442. The terminal cover 442 may be openably movable right and left in view of a part connected to the side cover 123.

When the connector 130 is not connected with an external device (not illustrated), a user may close the terminal cover 442 to protect the positive electrode terminal 131 and the negative electrode terminal 132. When desired, the user may open the terminal cover 242 to facilitate establishment of a connection between the positive and negative electrode terminals 131 and 132 and the external device.

As described above, the battery pack 400 according to the present embodiment may include the sealing member 440 coupled to the side cover 123 while surrounding the connector 130, thereby preventing moisture from permeating between the side cover 123 and the connector 130.

In addition, the battery pack 400 according to the present embodiment may include the terminal cover 442 that protects the positive and negative electrode terminals 131 and 132 of the connector 130.

An embodiment provides a battery pack, which may prevent moisture from permeating between a housing and a connector by providing a sealing member between the housing and the connector and, in particular, by providing a sealing member coupled to a side cover.

In addition, the battery pack according to an embodiment may protect positive and negative terminals of the connector by providing a terminal cover on a sealing member.

Exemplary embodiments of a battery pack have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a plurality of battery cells;
   a housing accommodating the plurality of battery cells;
   a connector coupled to the housing, at least a portion of the connector being exposed outside of the housing; and
   a sealing member coupled to the connector, wherein the sealing member includes a substantially U-shaped body, the body surrounding the exposed portion of the connector, and the body being substantially coplanar with at least one side surface of the housing,
   wherein:
   an interior surface of the body is conformally formed to a shape of the connector,
   the housing includes a case in which the battery cells are placed, a top cover covering an upper portion of the case; and a side cover covering the side surface of the case,
   the connector is coupled to the side cover, and
   the sealing member is coupled to the side cover,
   wherein the substantially U-shaped body includes three sides,
      wherein two of the three sides are inserted into and fill gaps between the connector and the side cover of the housing, and a remaining side is substantially coplanar with the side cover of the housing,
   wherein the connector includes:
      a positive electrode terminal electrically connected to a positive electrode tab of the battery cells; and
      a negative electrode terminal electrically connected to a negative electrode tab of the battery cells, and
   wherein:
   the sealing member includes:
      the body surrounding an exterior side of the connector, the body being coupled to one side surface of the housing; and
      a terminal cover covering the positive and negative electrode terminals of the connector, the terminal cover being coupled to a top surface of the housing, and
   the terminal cover includes a protrusion part therein.

2. The battery pack as claimed in claim 1, wherein the sealing member includes rubber.

3. The battery pack as claimed in claim 1, wherein the sealing member includes a thread hole therein.

4. The battery pack as claimed in claim 3, wherein the connector includes a thread groove therein, the thread groove corresponding to the thread hole.

5. The battery pack as claimed in claim 1, further comprising an end plate closely coupling the battery cells to the case.

6. The battery pack as claimed in claim 1, wherein the case includes:
   a bottom surface;
   a pair of long side surfaces connected to the bottom surface, the pair of long side surfaces being substantially perpendicular to the bottom surface; and
   a short side surface connected to the bottom surface and the long side surfaces, the short side surface being substantially perpendicular to the bottom surface.

7. The battery pack as claimed in claim 1, further comprising a circuit module between the battery cells and side cover, the circuit module being electrically connected to the connector.

8. The battery pack as claimed in claim 1, wherein the terminal cover has an opening part therein.

9. The battery pack as claimed in claim 1, wherein the body includes a protrusion groove detachably engagable with the protrusion part.

10. The battery pack as claimed in claim 1, wherein the terminal cover includes an opening groove therein.

11. A battery pack, comprising:
    a plurality of battery cells;
    a housing accommodating the plurality of battery cells;
    a connector coupled to the housing, at least a portion of the connector being exposed outside of the housing; and
    a sealing member coupled to the connector, wherein the sealing member includes a substantially U-shaped body, the body surrounding the exposed portion of the connector, and the body being substantially coplanar with at least one side surface of the housing,
    wherein an interior surface of the body is conformally formed to a shape of the connector,
    wherein the substantially U-shaped body includes three sides,
    wherein two of the three sides are inserted into and fill gaps between the connector and the side cover of the housing, and a remaining side is substantially coplanar with the side cover of the housing,
    wherein the connector includes:
      a positive electrode terminal electrically connected to a positive electrode tab of the battery cells; and
      a negative electrode terminal electrically connected to a negative electrode tab of the battery cells, and
    wherein:
    the sealing member includes:
      the body surrounding an exterior side of the connector, the body being coupled to one side surface of the housing; and
      a terminal cover covering the positive and negative electrode terminals of the connector, the terminal cover being coupled to a top surface of the housing, and
    the terminal cover includes a protrusion part therein.

* * * * *